(12) United States Patent
Kim et al.

(10) Patent No.: US 12,106,912 B2
(45) Date of Patent: Oct. 1, 2024

(54) BUTTON COMPOSITE STRUCTURE

(71) Applicant: TOVIS CO. LTD., Incheon (KR)

(72) Inventors: Yong Beom Kim, Incheon (KR); Joon Seog Kim, Gyeonggi-do (KR)

(73) Assignee: TOVIS CO., LTD., Incheon (KR)

( * ) Notice: Subject to any disclaimer, the term of this patent is extended or adjusted under 35 U.S.C. 154(b) by 41 days.

(21) Appl. No.: 17/796,268

(22) PCT Filed: Jan. 12, 2021

(86) PCT No.: PCT/KR2021/000361
§ 371 (c)(1),
(2) Date: Jul. 29, 2022

(87) PCT Pub. No.: WO2021/167246
PCT Pub. Date: Aug. 26, 2021

(65) Prior Publication Data
US 2023/0077786 A1   Mar. 16, 2023

(30) Foreign Application Priority Data

Feb. 20, 2020 (KR) .......................... 10-2020-0021259

(51) Int. Cl.
*H01H 13/14* (2006.01)
*G02F 1/1333* (2006.01)
(Continued)

(52) U.S. Cl.
CPC ....... *H01H 13/14* (2013.01); *G02F 1/133308* (2013.01); *H01H 13/06* (2013.01); *H01H 13/83* (2013.01)

(58) Field of Classification Search
CPC ........ H01H 13/14; H01H 13/06; H01H 13/83; H01H 2219/0622; H01H 13/70; G02F 1/133308; G02F 1/1333; G06F 3/0393
See application file for complete search history.

(56) References Cited

U.S. PATENT DOCUMENTS 9,519,349 B2 * 12/2016 Garvis ................. G06F 3/0202
2018/0046267 A1   2/2018 Kobayashi
(Continued)

FOREIGN PATENT DOCUMENTS

JP      7-29726      6/1995
JP      2012-129171  7/2012
(Continued)

OTHER PUBLICATIONS

Office Action dated Aug. 15, 2023 for Japanese Patent Application No. 2022-547905 and its English translation by Google Translate.
(Continued)

*Primary Examiner* — Lheiren Mae A Caroc
(74) *Attorney, Agent, or Firm* — Ladas & Parry, LLP

(57) ABSTRACT

Provided is a button complex structure including: a display panel including a first substrate, a second substrate on the first substrate, and a liquid crystal layer between the first substrate and the second substrate; a member on the second substrate; a first coupling member coupling the display panel and one surface of the member; a button structure disposed on the other surface that is opposite to the one surface of the member; and a second coupling member coupling the other surface of the member and the button structure, wherein the member includes a third substrate and a touch layer on the third substrate, the touch layer includes the one surface of the member, the touch layer is coupled to the display panel by the first coupling member, the button structure is directly coupled to the third substrate by the second coupling member, and the button structure includes a transparent conductive material.

11 Claims, 10 Drawing Sheets

(51) Int. Cl.
    *H01H 13/06*    (2006.01)
    *H01H 13/83*    (2006.01)

(56) References Cited

U.S. PATENT DOCUMENTS

| | | | |
|---|---|---|---|
| 2019/0272053 A1 | 9/2019 | Ballan et al. | |
| 2019/0278394 A1 | 9/2019 | Myers et al. | |
| 2023/0021789 A1* | 1/2023 | Kim | G06F 3/0443 |
| 2023/0142581 A1* | 5/2023 | Kim | G02F 1/133565 |
| | | | 349/56 |

FOREIGN PATENT DOCUMENTS

| | | |
|---|---|---|
| JP | 2016-61878 | 4/2016 |
| KR | 10-2010-0025407 | 3/2010 |
| KR | 10-2013-0025520 | 3/2013 |
| KR | 10-2018-0080151 | 7/2018 |
| WO | 2014/006756 | 1/2014 |

OTHER PUBLICATIONS

International Preliminary Report on Patentability (Chapter I) for PCT/KR2021/000361 issued on Aug. 23, 2022 and its English translation from WIPO (now published as WO 2021/167246).
International Search Report for PCT/KR2021/000361 mailed on Apr. 26, 2021 and its English translation from WIPO (now published as WO 2021/167246).
Written Opinion of the International Searching Authority for PCT/KR2021/000361 mailed on Apr. 26, 2021 and its English translation by Google Translate (now published as WO 2021/167246).
European Search Report dated Jan. 22, 2024 for European Patent Application No. 21757360.9.

* cited by examiner

BUTTON COMPOSITE STRUCTURE

CROSS-REFERENCE TO RELATED APPLICATIONS

The present application is the national stage of International Patent Application No. PCT/KR2021/000361 filed on Jan. 12, 2021, which claims the priority to Korean Patent Application No. 10-2020-0021259 filed in the Korean Intellectual Office on Feb. 20, 2020, the entire contents of which are incorporated herein by reference.

TECHNICAL FIELD

The present disclosure relates to a button complex structure.

BACKGROUND ART

In general, a button structure may penetrate through a rigid substrate such as glass or quartz and be fastened to a deck on a lower side of the rigid substrate.

However, in a process of drilling a through hole in the rigid substrate to fasten the button structure to the deck, damage to the rigid substrate may occur, cost consumption may be high, and the degree of freedom in design may be greatly reduced.

Meanwhile, a display panel is disposed on the lower side of the rigid substrate. Defects may occur not only in the button structure but also in the display panel due to water leakage of the through hole of the rigid substrate. Furthermore, the button structure further includes a circuit portion for receiving a button input signal. In the case of failure of the circuit portion, when the button structure is fastened to the deck and is difficult to separate from the deck, the rigid substrate should be disassembled and the failed button structure should be separated from the deck. In this case, it is not easy to disassemble the rigid substrate.

DISCLOSURE

Technical Problem

Aspects of the present disclosure provide a button complex structure including a button structure stacked directly on a rigid substrate without forming a through hole in the rigid substrate.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

Technical Solution

According to an aspect of the present disclosure, there is provided a button complex structure including: a display panel including a first substrate, a second substrate on the first substrate, and a liquid crystal layer between the first substrate and the second substrate; a member on the second substrate; a first coupling member coupling the display panel and one surface of the member; a button structure disposed on the other surface that is opposite to the one surface of the member; and a second coupling member coupling the other surface of the member and the button structure, wherein the member includes a third substrate and a touch layer on the third substrate, the touch layer includes the one surface of the member, the touch layer is coupled to the display panel by the first coupling member, the button structure is directly coupled to the third substrate by the second coupling member, and the button structure includes a transparent conductive material.

The button structure may include a button body portion fixed to the third substrate, a button mounting portion fastened to the button body portion, and a button portion connected to the button mounting portion.

The button body portion may include a locking pin, the button mounting portion may include a locking groove, and the button mounting portion may be configured to be fastened to the button body portion in such a way that the locking pin is inserted into the locking groove.

The button body portion may include a plurality of locking pins, and the button mounting portion may be configured to be separated from the button mounting portion in such a way that the plurality of locking pins are simultaneously removed from the locking groove by a plurality of unlocking pins, respectively.

The button complex structure may further include a conductive tape disposed between the button portion and the third substrate, wherein the conductive tape may be attached to the button portion.

When a physical input is applied to the button portion, the conductive tape may be in contact with the third substrate, and when the physical input is not applied to the button portion, the conductive tape may be spaced apart from the third substrate.

The button mounting portion may include an indentation portion indented in a direction away from the button portion, and the button portion may include a protrusion portion protruding toward the indentation portion, a damper being further disposed between the indentation portion and the protrusion portion.

The button complex structure may further include a circuit board disposed between the member and the display panel, wherein a light emitting element mounted on the circuit board may be further disposed.

The button complex structure may further include a signal line electrically connected to the circuit board, wherein the light emitting element may be configured to receive power through the signal line.

The light emitting element may be configured to emit light according to an input signal input to the button portion.

The signal line may be disposed between the member and the display panel, extend along an extension direction of the member, and penetrate through the first coupling member.

The button complex structure may further include a variable focus portion disposed on the light emitting element and disposed within the button mounting portion, wherein the variable focus portion may be configured to vary a focus of light provided from the light emitting element.

Details of other embodiments are included in the detailed description and drawings.

Advantageous Effects

According to the button complex structure according to an embodiment, it is possible to reduce the occurrence of damage to a rigid substrate, reduce the cost, and increase the degree of freedom in design by stacking a button structure directly on the rigid substrate without forming a through hole in the rigid substrate.

In addition, since the through hole is not formed, it is possible to reduce failure of the display panel and the button structure due to water leakage.

In addition, as the button structure includes a button body portion fixed to the rigid substrate and a button circuit portion including a circuit portion, it is possible to easily replace only the button circuit portion in the case of failure of the circuit portion.

In addition, since a button portion is implemented with a conductive material, and generates an input signal by an electrostatic touch driving method with a member including a touch layer, a button switch for generating the input signal and a circuit board may be omitted.

However, the effects of the embodiments are not restricted to the one set forth herein. The above and other effects of the embodiments will become more apparent to one of daily skill in the art to which the embodiments pertain by referencing the claims.

MODE FOR INVENTION

Advantages and features of the present disclosure and methods of achieving the same will become apparent with reference to the embodiments described below in detail in conjunction with the accompanying drawings. However, the present disclosure is not limited to embodiments to be described below, but may be implemented in various different forms, the present embodiments will be provided only in order to make the present disclosure complete and allow one of ordinary skill in the art to which the present disclosure pertains to completely recognize the scope of the present disclosure, and the present disclosure will be defined by the scope of the claims.

When an element or layer is referred to as being "on" another element or layer, it includes both a case in which the element or layer is directly on another element or layer and a case in which the element or layer is on another element or layer with the other element or layer interposed therebetween. The same reference numbers indicate the same components throughout the specification.

It will be understood that, although the terms "first", "second", and the like may be used to describe various components, these components should not be limited by these terms. These terms are only used to distinguish one component from another component. Accordingly, a first component discussed below could be termed a second component without departing from the teachings of the present disclosure.

Hereinafter, specific embodiments will be described with reference to the accompanying drawings.

Figure 1:
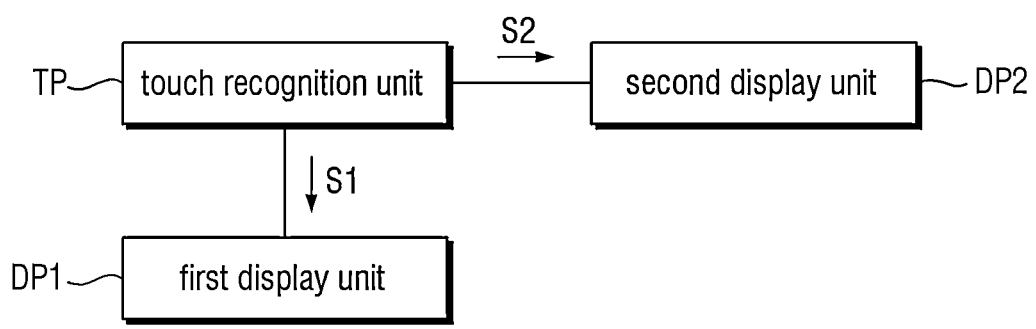
FIG. 1 is a block diagram of a button complex structure according to an embodiment.

FIG. 1 is a block diagram of a button complex structure according to an embodiment.

Referring to FIG. 1, a button complex structure according to an embodiment may include a touch recognition unit TP, a first display unit DP1, and a second display unit DP2.

The touch recognition unit TP may serve to recognize a touch input. For example, when a touch input is applied to the button complex structure, the touch recognition unit TP may generate touch input signals S1 and S2.

The first display unit DP1 may include a display panel that displays an image. A liquid crystal display panel may be applied as the display panel. In the following embodiments, the liquid crystal display panel is described as an example of the display panel, but the display panel is not limited thereto, and the present disclosure is also applicable to an electrophoretic display panel, an organic light emitting display panel, a micro light emitting diode (LED) display panel, a plasma display panel, a field emission display panel, a cathode ray display panel, and the like.

The first display unit DP1 may be electrically connected to the touch recognition unit TP. The first display unit DP1 may receive the touch input signal S1 generated by the touch recognition unit TP and display a screen corresponding to the touch input signal S1.

The second display unit DP2 may include a light emitting element that emits light. An example of the light emitting element may include an LED. That is, the second display unit DP2 may include an LED light emitting element. However, the second display unit DP2 is not limited thereto, and may include a halogen lamp, an incandescent light bulb, or a three-wavelength lamp.

The second display unit DP2 may be electrically connected to the touch recognition unit TP. The second display unit DP2 may receive the touch input signal S2 generated by the touch recognition unit TP and emit light in response to the touch input signal S2.

In some embodiments, the second display unit DP2 may also emit light regardless of the touch input signal S2 generated by the touch recognition unit TP.

Hereinafter, a more specific structure of the button complex structure according to an embodiment will be described. The reference numerals of each component of the button complex structure described above in FIG. 1 are attached for convenience of explanation and may be different from the reference numerals of each component of the button composite structure to be described below.

Figure 2:
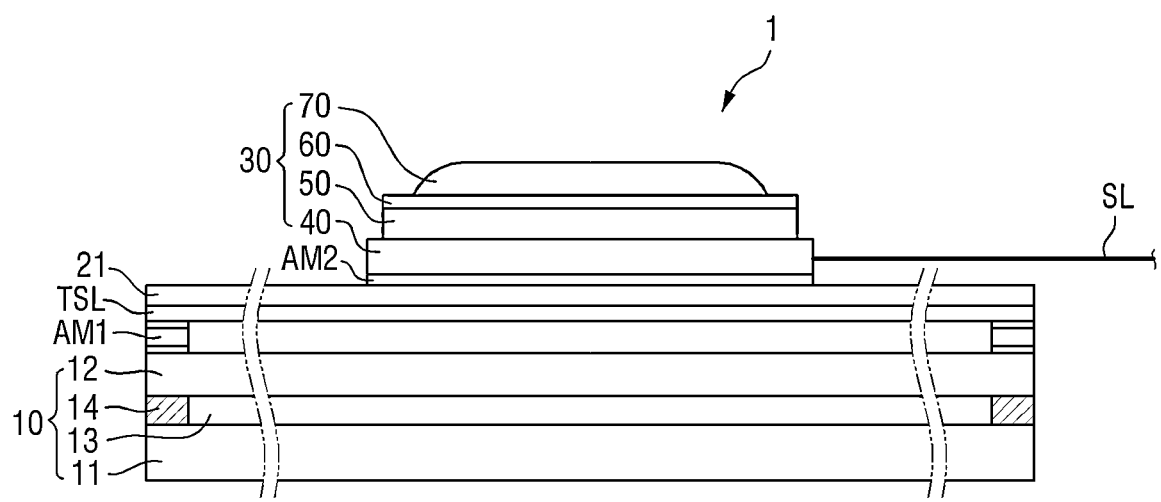
FIG. 2 is a cross-sectional view of a button complex structure according to an embodiment.

FIG. 2 is a cross-sectional view of a button complex structure according to an embodiment.

Referring to FIG. 2, a button complex structure 1 according to an embodiment may include a display panel 10, a member 20, and a button structure 30.

The display panel 10 may have the same structure as the first display unit DP1 described above with reference to FIG. 1.

The display panel 10 may include a first substrate 11, a second substrate 12 opposite to the first substrate 11, and a liquid crystal layer 13 interposed between the first substrate 11 and the second substrate 12. A sealing member 14 may be disposed on edges of the first substrate 11 and the second substrate 12 to couple the first substrate 11 and the second substrate 12 to each other and prevent liquid crystal molecules of the liquid crystal layer 13 from flowing out.

One of the first substrate 11 and the second substrate 12 may be a thin film transistor substrate, and the other may be a color filter substrate. In the present embodiment, the case in which the first substrate 11 is a thin film transistor substrate and the second substrate 12 is a color filter substrate is exemplified. A display direction may be an outer direction of an upper surface of the second substrate 12. The second substrate 12 may be disposed above the first substrate 11 in the display direction. Therefore, the second substrate 12 may be an upper substrate, and the first substrate 11 may be a lower substrate.

Each of the first substrate 11 and the second substrate 12 may include an insulating substrate made of glass, quartz, or the like, and structures such as a wiring, a metal, a semiconductor layer, an insulating film, a color filter, and a black matrix disposed thereon. The structures may be disposed on surfaces of the insulating substrate of the first substrate 11 and the insulating substrate of the second substrate 12 facing each other, respectively. In the drawing, for convenience, the illustration of the structures disposed on the insulating substrates is omitted, and only the shapes of the insulating substrates of the first substrate 11 and the second substrate 12 are illustrated. Hereinafter, when referring to a shape of a rear surface of the first substrate 11 or the second substrate 12, such a shape may refer to a shape of a rear surface of the insulating substrate of the first substrate 11 or a shape of a rear surface of the insulating substrate of the second substrate 12.

A member 20 attached to the display panel 10 may be disposed on the display panel 10.

The member 20 may include a third substrate 21 and a touch layer TSL. The touch layer TSL may be disposed on the third substrate 21. The touch layer TSL may be disposed between the third substrate 21 and the second substrate 12.

A first coupling member AM1 may be disposed between the touch layer TSL and the second substrate 12. The touch layer TSL and the second substrate 12 may be coupled to each other through the first coupling member AM1. The first coupling member AM1 may be a double-sided tape, but is not limited thereto, and a typical coupling member may be used.

The first coupling member AM1 may be disposed at both ends between the touch layer TSL and the second substrate 12. That is, a separation space may be disposed between the touch layer TSL and the second substrate 12 in a central portion in which the first coupling member AM1 is not disposed. The touch layer TSL and the second substrate 12 may be disposed to be spaced apart from each other through the separation space.

The third substrate 21 may be an insulating substrate made of glass, quartz, or the like. The third substrate 21 may include the same material as the first substrate 11. A size of the third substrate 21 in plan view may be the same as a size of the second substrate 12 in plan view, but is not limited thereto.

The touch layer TSL may be disposed on one surface of the third substrate 21 facing the second substrate 12.

The touch layer TSL may include a plurality of touch electrodes and a touch insulating layer covering the plurality of touch electrodes. The touch electrode may include a conductive material, and the touch insulating layer may include an inorganic material or an organic material.

The plurality of touch electrodes may be disposed on one surface of the third substrate 21, and the touch insulating layer may be disposed on the plurality of touch electrodes while covering the plurality of touch electrodes.

The touch insulating layer may be in direct contact with the first coupling member AM1. The touch insulating layer may be attached to the second substrate 12 through the first coupling member AM1.

The touch layer TSL may sense a touch input signal applied on the other surface that is opposite to one surface of the third substrate 21. The touch layer TSL may acquire the coordinates of a touch input point in a capacitance manner. In the capacitance method, coordinate information of a touched point may be acquired by a self capacitance manner or a mutual capacitance manner.

A button structure 30 may be disposed on the member 20. The button structure 30 may be disposed on the other surface of the third substrate 21. That is, the touch layer TSL may be disposed between the button structure 30 and the touch insulating layer, and the member 20 may be disposed between the button structure 30 and the display panel 10.

The button structure 30 may include a button body portion 40, a button mounting portion 50, a light emitting portion 60, and a button portion 70.

A second coupling member AM2 may be disposed between the button structure 30 and the third substrate 21. The second coupling member AM2 may be an adhesive, but is not limited thereto.

The button body portion 40 may be in direct contact with the second coupling member AM2. The button body portion 40 may be directly attached to and fixed to the other surface of the third substrate 21 through the second coupling member AM2.

The button mounting portion 50 may be coupled to the button body portion 40, and the button portion 70 may be connected to the button mounting portion 50.

Although not illustrated, a circuit board (refer to 'CB' in FIG. 4) may be further disposed between the member 20 and the display panel 10. The light emitting portion 60 may include a light emitting element and a variable focus portion. The light emitting element may be disposed on the circuit board CB disposed between the member 20 and the display panel 10. The variable focus portion may be disposed in the button body portion 40.

Figure 3:
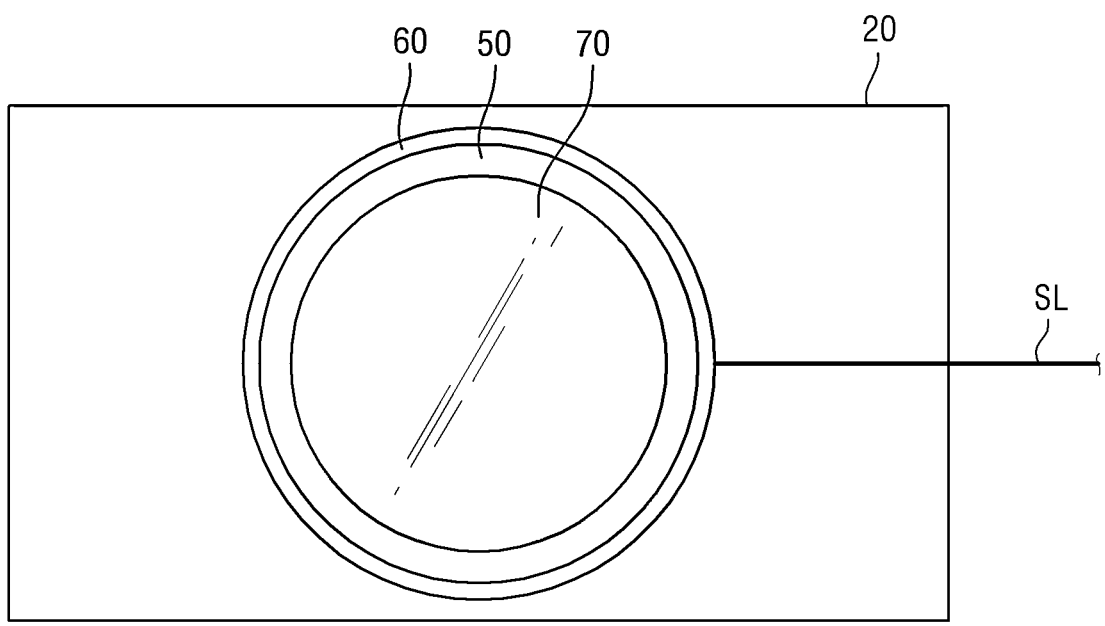
FIG. 3 is a plan view of the button complex structure according to an embodiment.

FIG. 3 is a plan view of the button complex structure according to an embodiment.

Referring to FIG. 3, a planar shape of the button mounting portion 50 and the light emitting portion 60 may include a ring shape including a circular opening. A planar shape of the button portion 70 may include a circular shape. However, the present disclosure is not limited thereto, and the planar shape of the button mounting portion 50 and the light emitting portion 60 is not limited as long as it includes an opening in the central portion and surrounds the opening. In addition, the planar shape of the button portion 70 is not limited thereto, and may include a rectangle, a square, an oval, or other polygons.

In the illustrated embodiment, a shape of the opening of the button mounting portion 50 and the planar shape of the button portion 70 may be the same. However, the present disclosure is not limited thereto, and the shape of the opening of the button mounting portion 50 and the planar shape of the button portion 70 may be different from each other.

Figure 4:
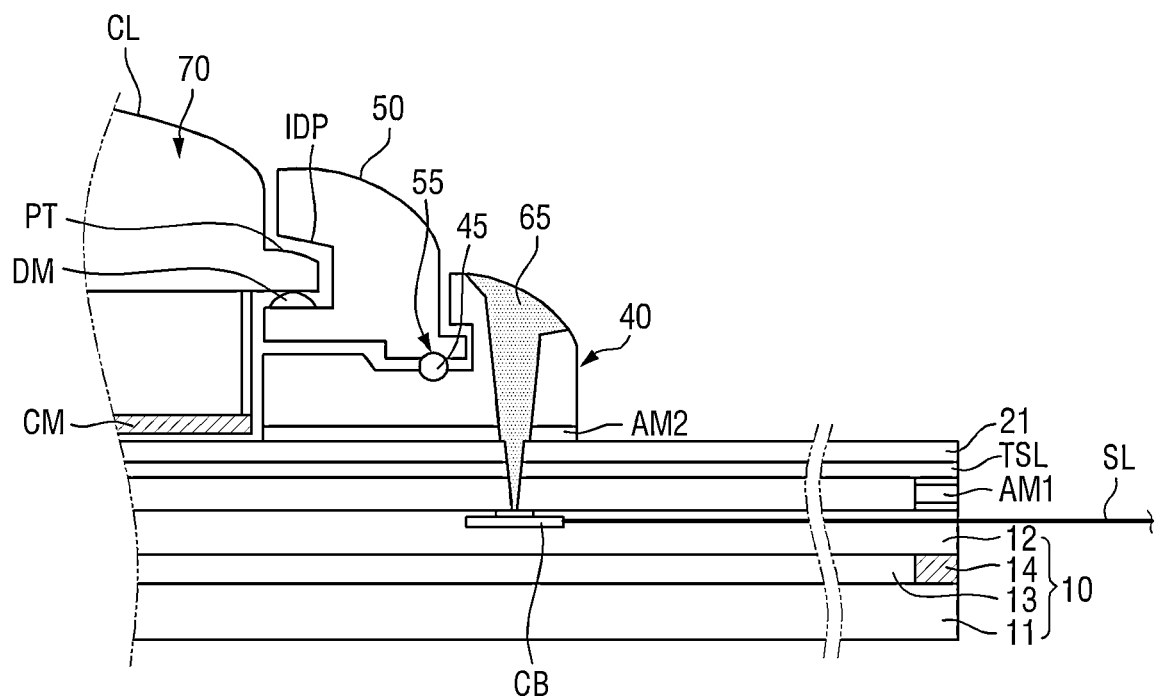
FIG. 4 is a cross-sectional view of the button complex structure according to an embodiment.
Figure 5:
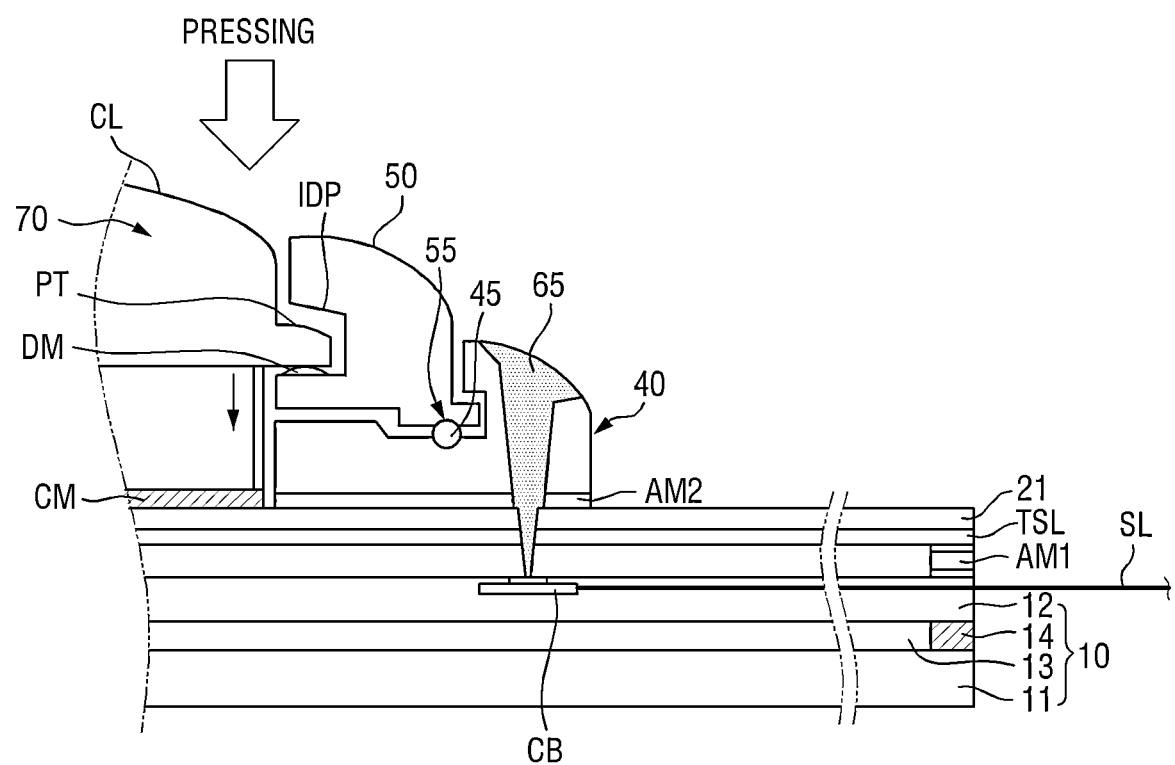
FIG. 5 is a cross-sectional view of the button complex structure when an input is applied to a button portion.

FIG. 4 is a cross-sectional view of a button complex structure according to an embodiment. FIG. 5 is a cross-sectional view of the button complex structure when an input is applied to a button portion.

Referring to FIGS. 4 and 5, the button body portion 40 is not limited thereto, but may be divided into a first portion forming a lower line and a second portion protruding from the first portion. A locking pin 45 may be disposed on the first portion of the button body portion 40. The locking pin 45 may protrude from the first portion of the button body portion 40 in a thickness direction.

The button mounting portion 50 may be disposed on the button body portion 40. The button mounting portion 50 may be disposed on an upper portion of the first portion of the button body portion 40 and on a left side of the second portion.

A locking groove 55 may be disposed on a lower surface of the button body portion 40. The locking groove 55 may include a shape recessed from the lower surface of the button body portion 40 in an upper direction.

The button mounting portion 50 may have a lock/unlock relationship with the button body portion 40 in such a way that the locking pin 45 is inserted into the locking groove 55. That is, when the locking pin 45 is inserted into the locking groove 55, the button mounting portion 50 may have a fastening relationship (locked state) with the button body portion 40, and when the locking pin 45 is removed from the locking groove 55, the button mounting portion 50 may have a separation relationship (unlocked state) with the button body portion 40.

The insertion/removal relationship between the locking groove 55 and the locking pin 45 will be described later with reference to FIGS. 6 to 10.

In an embodiment, a circuit board CB may be disposed between the member 20 and the display panel 10. A light emitting element 61 included in the light emitting portion 60 may be mounted on the circuit board CB. The light emitting portion 60 may have the same configuration as the second display unit DP2 described above with reference to FIG. 1.

An example of the light emitting element 61 may include an LED. That is, the light emitting element 61 may include an LED light emitting element. However, the light emitting element 61 is not limited thereto, and may include a halogen lamp, an incandescent light bulb, or a three-wavelength lamp.

A signal line SL may be connected to one side (right end in the drawing) of the circuit board 51. The signal line SL may be connected to one side (right end in the drawing) of the circuit board 51, and may extend in a right direction in the drawing and then extend through the first coupling member AM1. The signal line SL may be electrically connected to the display panel 10.

The button mounting portion 50 may include an indentation pattern IDP in which a portion of the button mounting portion 50 facing the button portion 70 is indented in a direction away from the button portion 70. That is, the indentation pattern IDP may include a shape indented in a right direction in the drawing from a side surface of the button mounting portion 50 facing the button portion 70.

Due to the indentation pattern IDP of the button mounting portion 50, the button mounting portion 50 may include a left and right inverted "⊓"-shaped cross-sectional shape. A damper DM may be further disposed on a lower side (or line) of the left and right inverted "⊓"-shaped cross-sectional shape.

The button portion 70 may be disposed on the side surface of the button mounting portion 50 and may be disposed on the damper DM of the button mounting portion 50. The button portion 70 may include a protrusion pattern PT protruding toward the indentation pattern IDP of the button mounting portion 50. That is, the protrusion pattern PT may include a shape protruding toward the right direction in the drawing.

The damper DM may be disposed between the protrusion pattern PT and the lower side of the left and right inverted "⊏" cross-sectional shape of the button mounting portion 50. The damper DM may be in direct contact with the protrusion pattern PT and the lower side of the left and right inverted "⊏" cross-sectional shape of the button mounting portion 50, respectively.

The button portion 70 may include a transparent material. A variable focus portion 65 may be further disposed on an upper surface of the button mounting portion 50 disposed to overlap the light emitting element.

The variable focus portion 65 may be disposed to overlap the light emitting element 61 in the thickness direction.

The variable focus portion 65 may serve to variably control a focus of light emitted from the light emitting element 61. For example, the variable focus portion 65 may include an optical lens.

The button portion 70 may include a transparent conductive material. Examples of the transparent conductive material may include indium tin oxide (ITO), indium zinc oxide (IZO), antimony zinc oxide (AZO), indium tin zinc oxide (ITZO), zinc oxide (ZnO), tin oxide (SnO$_2$), carbon nano tube, graphene, conductive polymer (e.g. PEDOT), and silver nanowire (AgNW)

In an embodiment, the button portion 70 may be formed by coating a surface thereof with the transparent conductive material. The transparent conductive material may be coated on an entire surface of the button portion 70.

A conductive tape CM may be further disposed between the button portion 70 coated with the transparent conductive material and the member 20 (the third substrate 21). For example, the conductive tape CM may be disposed between a lower portion (lower surface) of the button portion 70 coated with the transparent conductive material and the member 20 (the third substrate 21). The conductive tape CM may be attached to the lower portion (lower surface) of the button portion 70.

The conductive tape CM may include an elastic material and conductive material.

When no physical pressure is applied to the button portion 70, the conductive tape CM may be disposed to be spaced apart from the member 20 (the third substrate 21) in the thickness direction as illustrated in FIG. 4, and when a predetermined physical pressure is applied to the button portion 70, the conductive tape CM may be in direct contact with the member 20 (the third substrate 21) as illustrated in FIG. 5. In some embodiments, even when a predetermined physical pressure is applied to the button portion 70, the conductive tape CM may not be in direct contact with the member 20 (the third substrate 21) as illustrated in FIG. 5.

Hereinafter, an operation of the button complex structure 1 will be described in more detail.

A physical touch signal may be input through the button portion 70. The physical touch signal may be a physical pressure. Hereinafter, the physical touch signal will be referred to as an input signal.

When the input signal is applied through the button portion 70 including the transparent conductive material, the button portion 70 moves in a lower direction (the thickness direction) in the drawing, and as a result, the conductive tape CM on the lower surface of the button portion 70 comes into contact with the member 20 (the third substrate 21). Even if the button portion 70 moves in the lower direction (the thickness direction) in the drawing as described above, the conductive tape CM on the lower surface of the button portion 70 may not come into contact with the member 20 (the third substrate 21). However, even in this case, a separation distance between the conductive tape CM and the member 20 is smaller than when no input signal is applied through the button portion 70.

An external device electrically connected to the display panel 10 may determine whether or not an input signal is applied to the button portion 70 and a strength of the input signal through a separation distance between the touch layer TSL of the member 20 and the conductive button portion 70, and the conductive tape CM attached thereto (specifically, a separation distance between the conductive tape CM and the touch layer TSL).

For example, as illustrated in FIG. 4, when the input signal is not applied to the button portion 70, the external device may recognize that the input signal is not applied to the button portion 70 because the touch layer TSL of the member 20 and the conductive button portion 70, and the conductive tape CM attached thereto exist to be spaced apart from each other, and as illustrated in FIG. 5, when the input signal is applied to the button portion 70, the external device may recognize that the input signal is applied to the button portion 70 because the touch layer TSL of the member 20 and the conductive button portion 70, and the conductive tape CM attached thereto are in contact with each other. The external device may recognize that the input signal is applied to the button portion 70 when the separation distance between the conductive tape CM and the member 20 is a predetermined separation distance or less even if the input signal is applied to the button portion 70, but the conductive tape CM does not come into contact with the member 20 as described above.

When the external device recognizes that the input signal is applied to the button portion 70 in the above-described manner, the external device may control the display panel 10 so that the display panel 10 outputs a specific screen.

The damper DM may be disposed between the protrusion pattern PT and the lower side of the left and right inverted "⊏" cross-sectional shape of the button mounting portion 50. The damper DM may be in direct contact with the protrusion pattern PT and the lower side of the left and right inverted "⊏" cross-sectional shape of the button mounting portion 50, respectively. The damper DM may include a flexible material. For example, the damper DM may include an elastic material that is relatively freely contracted and stretched.

In the case in which the damper DM is not disposed, even when the input signal is applied, the protrusion pattern PT of the button portion 70 interferes with the lower side of the left and right inverted "⊤" shape of the button mounting portion 50, and thus the button portion 70 may not move in the lower direction (the thickness direction). However, in the button complex structure 1 according to an embodiment, since the flexible damper DM is disposed between the protrusion pattern PT and the lower side of the left and right inverted "⊏" cross-sectional shape of the button mounting portion 50, it is possible to not only prevent non-movement of the protrusion pattern PT of the button portion 70 in the lower direction (the thickness direction) due to the interference with the lower side of the left and right inverted "⊔" shape of the button mounting portion 50 when the input signal is applied to the button portion 70, but also facilitate the movement of the button portion 70 in the upper direction (the thickness direction) again when the input signal is no longer applied thereto.

The plurality of signal lines SL may include a first signal line and a second signal line. The light emitting element 61 may be configured to receive power through the first signal line among the signal lines SL. That is, the power may be supplied to the light emitting element 61 through the first signal line.

The light emitting element 61 may be configured to emit light according to an input signal input to the button portion 70. In this case, the second signal line among the plurality of signal lines SL may serve to transmit the input signal input to the button portion 70 to a main control unit and to provide a signal for controlling a light emitting event of the light emitting element 61 from the main control unit to the light emitting element 61 of the circuit board 51 The second signal line may be electrically connected to the external device electrically connected to the display panel 10.

Figure 6A:
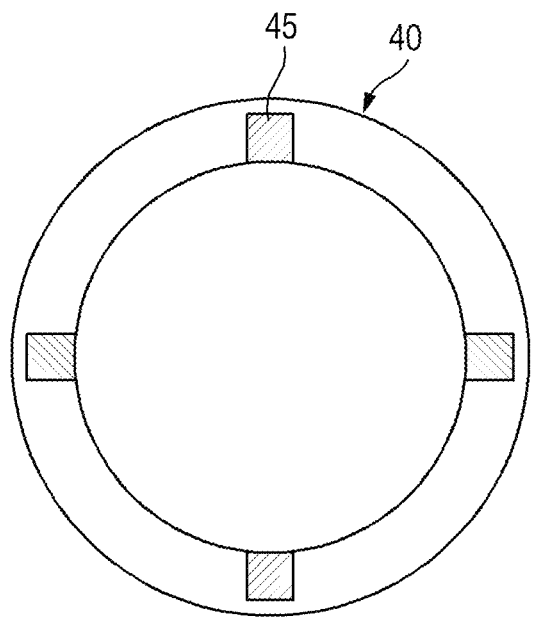
FIGS. 6A and 6B are plan views illustrating a button body portion and a button circuit portion according to an embodiment.
Figure 6B:
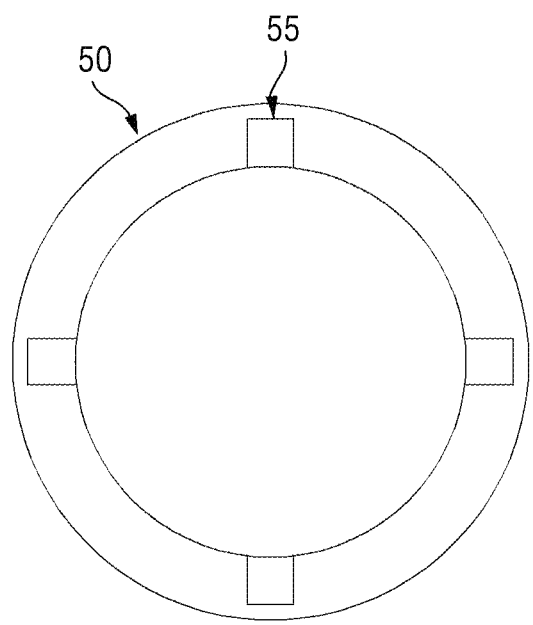
Figure 7:
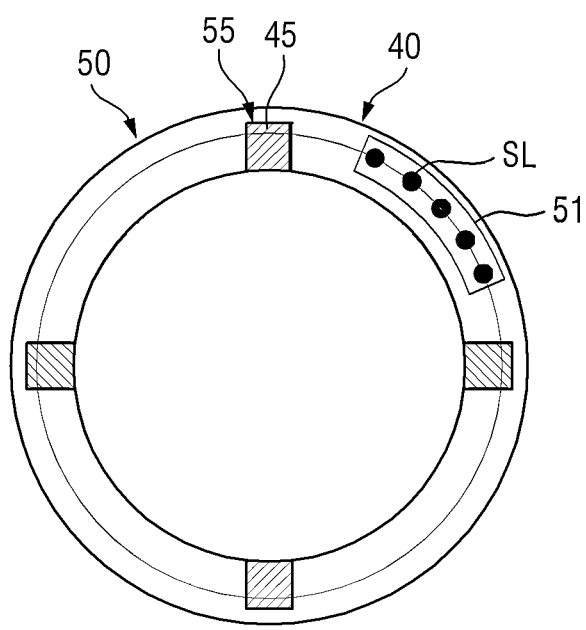
FIG. 7 is a plan vies illustrating a state in which the button body portion and the button circuit portion are fastened according to an embodiment.
Figure 8:
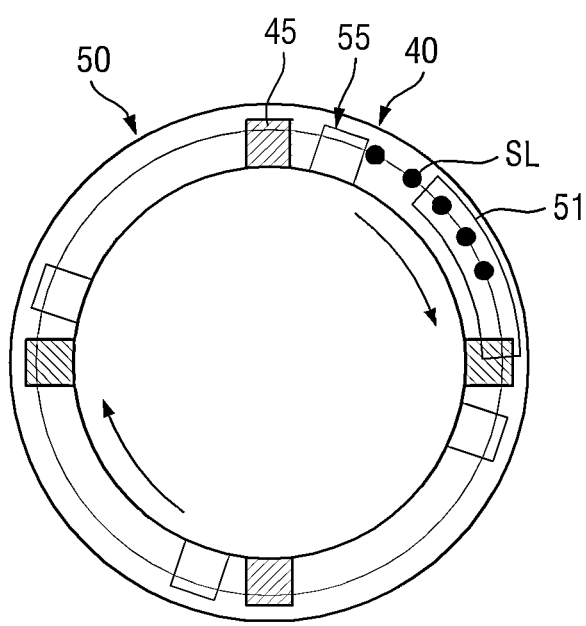
FIG. 8 is a plan view illustrating a state in which button body portion and the button circuit portion are disassembled according to an embodiment.
Figure 9:
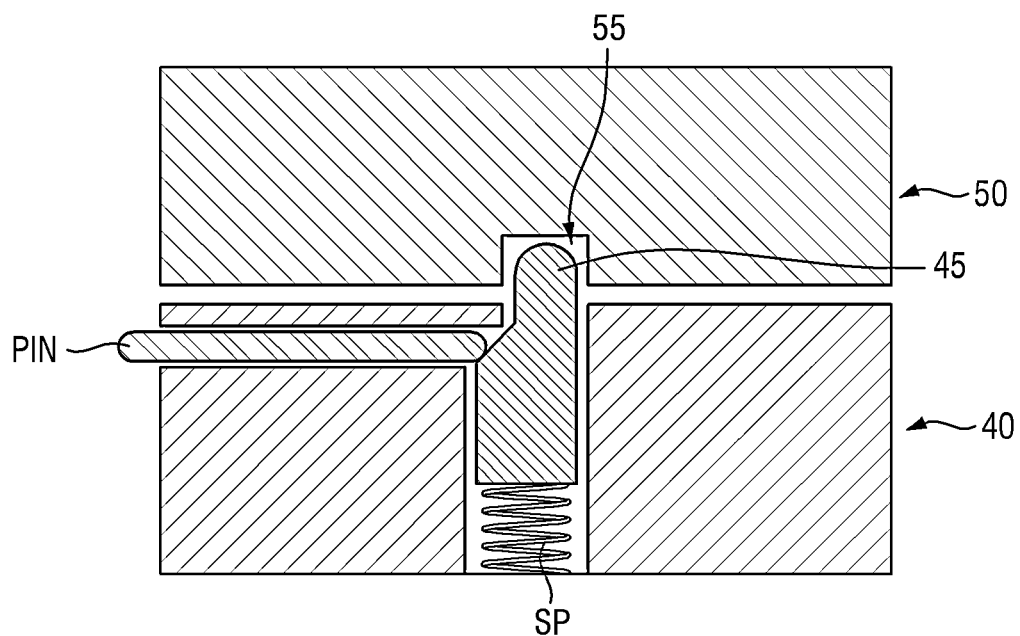
FIG. 9 is a cross-sectional view illustrating a state in which the button body portion and the button circuit portion are fastened according to an embodiment.
Figure 10:
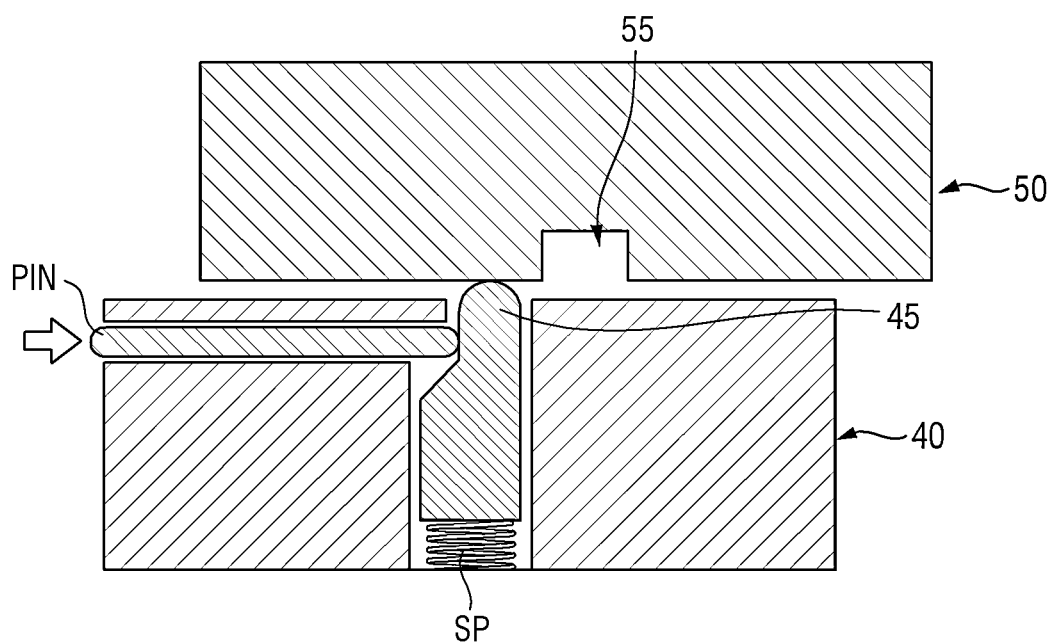
FIG. 10 is a cross-sectional view illustrating a state in which the button body portion and the button circuit portion are disassembled according to an embodiment.

FIGS. 6A and 6B are plan views illustrating a button body portion and a button circuit portion according to an embodiment. FIG. 7 is a plan view illustrating a state in which the button body portion and the button circuit portion are fastened according to an embodiment. FIG. 8 is a plan view illustrating a state in which the button body portion and the button circuit portion are disassembled according to an embodiment. FIG. 9 is a cross-sectional view illustrating a state in which the button body portion and the button circuit portion are fastened according to an embodiment. FIG. 10 is a cross-sectional view illustrating a state in which the button body portion and the button circuit portion are disassembled according to an embodiment.

First, referring to FIGS. 6A and 6B, there may be a plurality of locking pins 45 of the button body portion 40. The arrangement of the locking pins 45 illustrated in the drawings is not limited thereto.

There may be a plurality of locking grooves 55 of the button mounting portion 50. In one embodiment, the number of locking grooves 55 may be the same as the number of locking pins 45.

Referring to FIG. 7, the plurality of locking pins 45 and the plurality of locking grooves 55 may overlap each other in the thickness direction.

The locking pin 45 protruding in the thickness direction from the surface of the button body portion 40 may be inserted into the locking groove 55 indented in the upper direction from the lower surface of the button body portion 40. The plurality of locking pins 45 may be respectively inserted into the corresponding locking grooves 55 in the thickness direction.

As such, the button mounting portion 50 may have a lock/unlock relationship with the button body portion 40 in such a way that the locking pins 45 are inserted into the locking grooves 55.

The locking pin 45 may include an insertion portion inserted into the locking groove 55, a body portion connected to a lower portion of the insertion portion, and an elastic portion SP connected to a lower portion of the body portion. In cross-sectional view, a width of the insertion portion may be smaller than a width of the body portion and the elastic portion SP, respectively. A portion of the body portion that protrudes to one side from the insertion portion may have an inclined shape in cross-sectional view.

Referring to FIG. 8, the button mounting portion 50 may be separated from the button body portion 40 by rotating the button mounting portion 50 fastened with the button body portion 40 clockwise (illustrated in the drawing) or counterclockwise as in the embodiment of FIG. 7. However, even when the button mounting portion 50 is rotated, the locking pins 45 may not be easily removed from the locking grooves 55 due to the locking pins 45 inserted into the locking grooves 55.

Referring to FIGS. 9 and 10, the button mounting portion 50 may be separated from the button body portion 40 in such a way that the locking pin 45 is removed from the locking groove 55 by an unlocking pin PIN.

That is, the unlocking pin PIN may remove the insertion portion of the locking pin 45 from the locking groove 55 by pressing an inclined portion of the body portion of the locking pin 45 protruding from the insertion portion to one side in the other direction opposite to the one side.

The locking pin 45 according to an embodiment further includes the elastic portion SP connected to the lower portion of the body portion as described above, and the elastic portion SP may include a spring. When the inclined portion of the body portion of the locking pin 45 protruding from the insertion portion to one side is pressed in the other direction opposite to the one side through the unlocking pin PIN, the elastic portion SP may serve to allow the locking pin 45 to easily move in the lower direction so that the insertion portion may be easily removed from the locking groove 55.

Since there are a plurality of locking grooves 55 and locking pins 45 corresponding to each other according to an embodiment, the button body portion 40 and the button mounting portion 50 may be completely separated from each other only when the plurality of locking pins 45 are simultaneously moved in the lower direction.

That is, the button mounting portion 50 may be completely separated from the button body portion 40 in such a way that the plurality of corresponding locking pins 45 are simultaneously removed from the plurality of locking grooves 55 by a plurality of unlocking pins PIN, respectively.

As illustrated in FIG. 10, when the insertion portion is removed from the locking groove 55, the button mounting portion 50 may be separated from the button body portion 40 by rotating the button mounting portion 50 fastened with the button body portion 40 clockwise (illustrated in the drawing) or counterclockwise as described with reference to FIG. 8.

When the button structure penetrates through the third substrate and is fastened to a deck on a lower side of the third substrate, damage to the third substrate may occur, cost consumption may be high, and the degree of freedom in design may be greatly reduced in a process of drilling a through hole in the third substrate to fasten the button structure to the deck.

However, in the complex structure 1 according to an embodiment, the occurrence of damage to the third substrate 21 may be reduced, the cost may be reduced, and the degree of freedom in design may be increased by stacking the button structure 30 directly on the third substrate 21 without forming the through hole in the third substrate 21.

In addition, when the button structure is fastened to the deck on the lower side of the third substrate through the through hole of the third substrate, defects occur not only in the button structure but also in the display panel due to water leakage of the through hole of the third substrate However, in the complex structure 1 according to an embodiment, since the through hole is not formed in the third substrate 21, failure of the display panel 10 and the button structure 30 due to water leakage may be reduced.

Furthermore, the button structure further includes a circuit portion for receiving a button input signal. In the case of failure of the circuit portion, when the button structure is fastened to the deck and is difficult to separate from the deck, the third substrate needs to be disassembled and the failed button structure needs to be separated from the deck. In this case, since it is not easy to disassemble the third substrate, it may take a lot of time to repair the button structure.

However, in the button complex structure 1 according to an embodiment, as the button body portion 40 that does not include the circuit portion including the circuit board 51 is fixed to the third substrate and the button mounting portion 50 including the circuit portion is locked/unlocked with the button body portion 40, the button structure may be repaired in a short period of time because only the button mounting portion 50 may be easily replaced when the circuit portion fails.

Furthermore, as the locking groove 55 and the locking pin 45 corresponding to each other of the button complex structure 1 according to an embodiment are configured in plural, it is possible to easily prevent theft of the button body portion 40 and the button portion 70 because the button mounting portion 50 needs to be completely separated from the button body portion 40 in such a way that the plurality of corresponding locking pins 45 are simultaneously removed from the plurality of locking grooves 55 by the plurality of unlocking pins PIN, respectively.

Furthermore, in the button complex structure 1 according to an embodiment, since the button portion 70 includes the transparent conductive material and operates in an electrostatic manner with the touch layer TSL of the member 20, a button switch for accommodating the input signal of the button portion 70 and a circuit board on which the button switch is mounted may be omitted, so that the configuration of the button complex structure 1 may be simplified.

The embodiments of the present disclosure have been described hereinabove with reference to the accompanying drawings, but it will be understood by one of ordinary skill in the art to which the present disclosure pertains that various modifications and alterations may be made without departing from the technical spirit or essential feature of the present disclosure. Therefore, it should be understood that the embodiments described above are illustrative in all aspects and not restrictive.

The invention claimed is:

1. A button complex structure comprising:
   a display panel including a first substrate, a second substrate on the first substrate, and a liquid crystal layer between the first substrate and the second substrate;
   a member on the second substrate;
   a first coupling member coupling the display panel and one surface of the member;
   a button structure disposed on an other surface of the member that is opposite to the one surface of the member; and
   a second coupling member coupling the other surface of the member and the button structure,
   wherein the member includes a third substrate and a touch layer on the third substrate,
   the touch layer includes the one surface of the member,
   the touch layer is coupled to the display panel by the first coupling member,
   the button structure is directly coupled to the third substrate by the second coupling member, and
   the button structure includes a transparent conductive material, and
   wherein the button structure includes a button body portion fixed to the third substrate, a button mounting portion fastened to the button body portion, and a button portion connected to the button mounting portion, and the button portion includes the transparent conductive material.

2. The button complex structure of claim 1, wherein the button body portion includes a locking pin, the button mounting portion includes a locking groove, and the button mounting portion is configured to be fastened to the button body portion in such a way that the locking pin is inserted into the locking groove.

3. The button complex structure of claim 2, wherein the button body portion includes a plurality of locking pins, and the button mounting portion is configured to be separated from the button body portion in such a way that the plurality of locking pins are simultaneously removed from the locking groove by a plurality of unlocking pins, respectively.

4. The button complex structure of claim 1, further comprising a conductive tape disposed between the button portion and the third substrate, wherein the conductive tape is attached to the button portion.

5. The button complex structure of claim 4, wherein when a physical input is applied to the button portion, the conductive tape is in contact with the third substrate, and when the physical input is not applied to the button portion, the conductive tape is spaced apart from the third substrate.

6. The button complex structure of claim 5, wherein the button mounting portion includes an indentation portion indented in a direction away from the button portion, and the button portion includes a protrusion portion protruding toward the indentation portion, a damper being further disposed between the indentation portion and the protrusion portion.

7. The button complex structure of claim 1, further comprising a circuit board disposed between the member and the display panel, wherein a light emitting element mounted on the circuit board is further disposed.

8. The button complex structure of claim 7, further comprising a signal line electrically connected to the circuit board, wherein the light emitting element is configured to receive power through the signal line.

9. The button complex structure of claim 8, wherein the light emitting element is configured to emit light according to an input signal input to the button portion.

10. The button complex structure of claim 8, wherein the signal line is disposed between the member and the display panel, extends along an extension direction of the member, and penetrates through the first coupling member.

11. The button complex structure of claim 10, further comprising a variable focus portion disposed on the light emitting element and disposed within the button mounting portion, wherein the variable focus portion is configured to vary a focus of light provided from the light emitting element.

* * * * *